(12) United States Patent
Tanaka

(10) Patent No.: US 8,990,617 B2
(45) Date of Patent: Mar. 24, 2015

(54) FAULT-TOLERANT COMPUTER SYSTEM, FAULT-TOLERANT COMPUTER SYSTEM CONTROL METHOD AND RECORDING MEDIUM STORING CONTROL PROGRAM FOR FAULT-TOLERANT COMPUTER SYSTEM

(75) Inventor: Yukihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 13/443,813

(22) Filed: Apr. 10, 2012

(65) Prior Publication Data

US 2012/0266018 A1    Oct. 18, 2012

(30) Foreign Application Priority Data

Apr. 11, 2011    (JP) ................. 2011-087745

(51) Int. Cl.
  G06F 11/00    (2006.01)
  G06F 11/20    (2006.01)
  G06F 11/14    (2006.01)

(52) U.S. Cl.
  CPC ........ *G06F 11/2097* (2013.01); *G06F 11/1438* (2013.01); *G06F 11/1484* (2013.01); *G06F 11/2028* (2013.01); *G06F 11/2038* (2013.01); *G06F 11/2048* (2013.01)
  USPC .............................................. 714/13; 718/1

(58) Field of Classification Search
  CPC .............. G06F 9/45533; G06F 9/4856; G06F 11/1407; G06F 11/1438; G06F 11/1484; G06F 11/2097
  USPC ........ 714/4.1, 4.11, 6.3, 10–13, 15, 19; 718/1
  See application file for complete search history.

(56) References Cited

U.S. PATENT DOCUMENTS

| | | | |
|---|---|---|---|
| 6,697,878 B1 * | 2/2004 | Imai ............................ | 719/316 |
| 7,409,577 B2 * | 8/2008 | Wing et al. .................. | 714/4.12 |
| 7,900,005 B2 * | 3/2011 | Kotsovinos et al. ......... | 711/162 |
| 8,484,161 B2 * | 7/2013 | Baker et al. .................. | 707/639 |
| 8,639,984 B2 * | 1/2014 | McNeeney ................... | 714/38.1 |
| 2004/0210898 A1 | 10/2004 | Bergen et al. | |

(Continued)

FOREIGN PATENT DOCUMENTS

| | | |
|---|---|---|
| JP | 09-223079 A | 8/1997 |
| JP | 10-320223 A | 12/1998 |

(Continued)

OTHER PUBLICATIONS

Japanese Office Action dated Jan. 13, 2015 with a partial English translation thereof.

*Primary Examiner* — Scott Baderman
*Assistant Examiner* — Joseph Kudirka
(74) *Attorney, Agent, or Firm* — McGinn IP Law Group, PLLC

(57) ABSTRACT

A fault-tolerant computer system that includes a computer including a virtual machine on which a guest operating system (OS) is operating and a computer in operation, the computer including a snapshot manager that saves a guest OS snapshot, which includes difference information at each checkpoint, of the guest OS in a memory of the computer, and sends an instruction at each checkpoint to copy the guest OS snapshot as a guest OS snapshot to a memory of a computer via a transfer unit, and that computer includes a snapshot manager that activates a guest OS based on the guest OS snapshot when the computer stops.

17 Claims, 8 Drawing Sheets

* CHECKPOINTS ARE SET FOR WHICHEVER IS SMALLER, THE ACCUMULATION TIME FOR A PREDETERMINED DIFFERENCE AMOUNT OR A PREDETERMINED TIME $t_m$.
* THE REDUCTION IN THE ROLLBACK TIME IS = $t_{d-2} - t_m$.

(56) References Cited

U.S. PATENT DOCUMENTS

| | | |
|---|---|---|
| 2007/0094659 A1* | 4/2007 | Singh et al. ............ 718/1 |
| 2008/0028402 A1 | 1/2008 | Senoo |
| 2009/0083735 A1 | 3/2009 | Kimura |
| 2010/0077165 A1* | 3/2010 | Lu et al. ............ 711/162 |
| 2010/0082922 A1* | 4/2010 | George et al. ......... 711/162 |
| 2010/0107158 A1* | 4/2010 | Chen et al. ............ 718/1 |

FOREIGN PATENT DOCUMENTS

| | | |
|---|---|---|
| JP | 2006-277690 A | 10/2006 |
| JP | 2008-033483 A | 2/2008 |
| JP | 2009-080692 A | 4/2009 |
| JP | 2009-199197 A | 9/2009 |
| JP | 2010-086227 A | 4/2010 |
| JP | 4468426 B2 | 5/2010 |
| JP | 2010-134710 A | 6/2010 |

\* cited by examiner

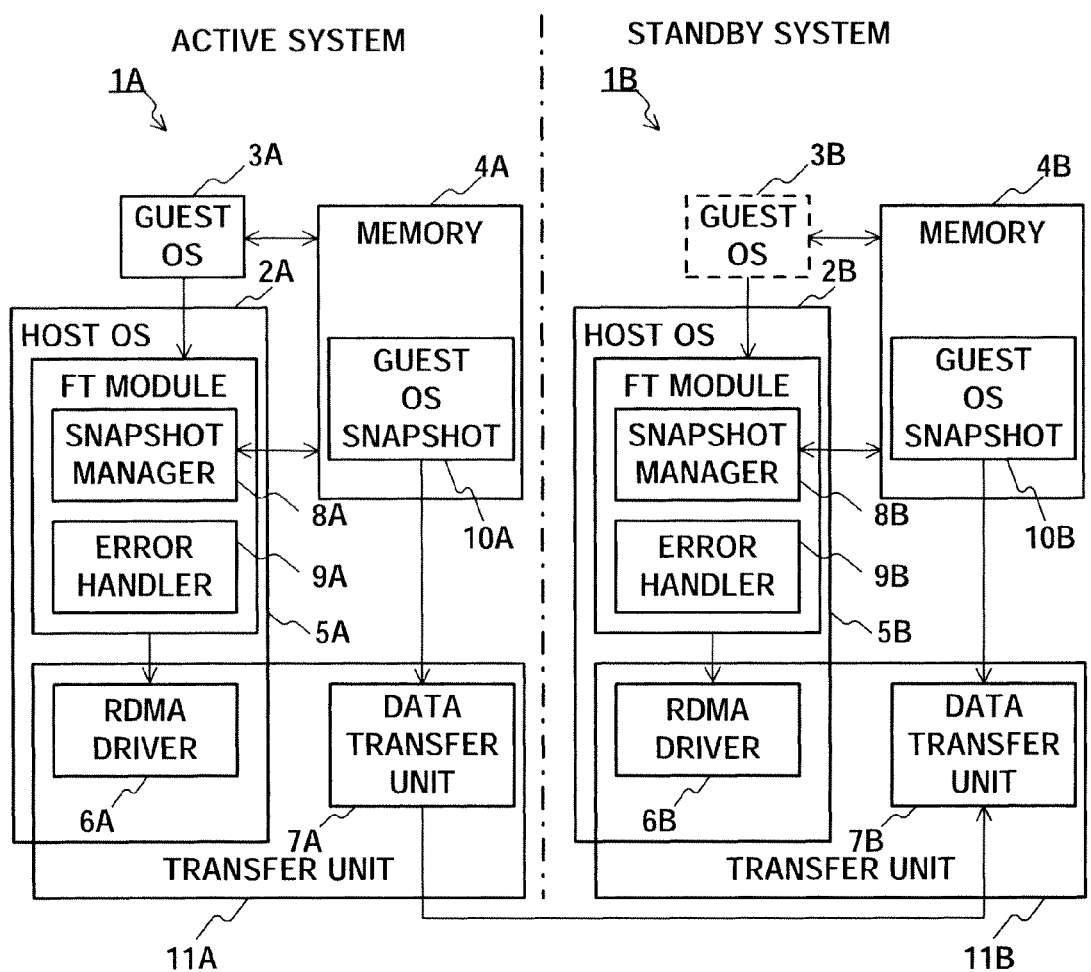

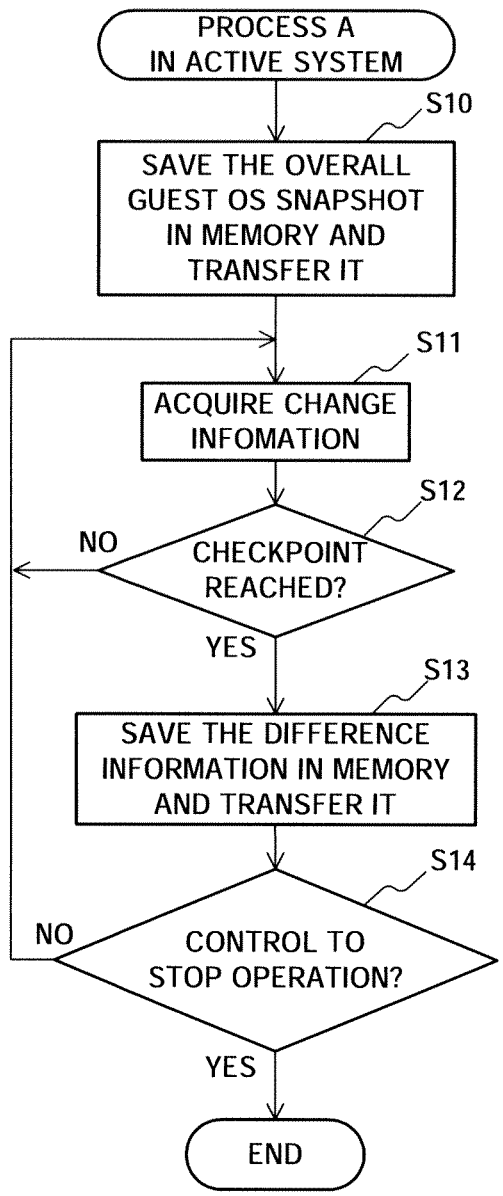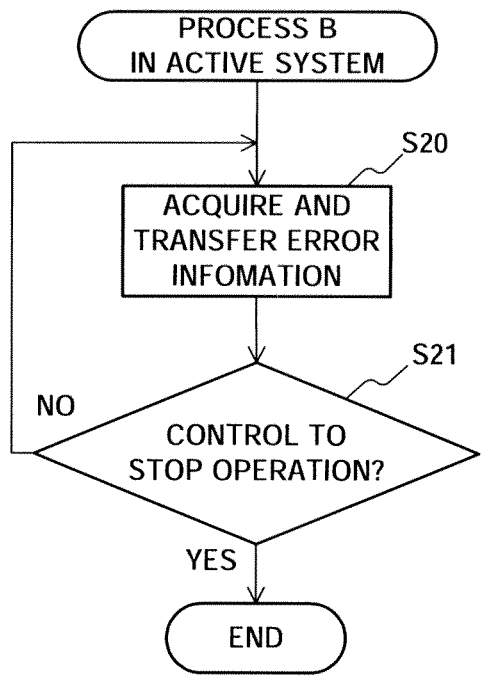
FIG.3A
FIG.3B

* THE ACCUMULATION TIME UNTIL A FIXED DIFFERENCE AMOUNT IS ACCUMULATED DIFFERS. THE COPY TIME IS FIXED($t_0$).

* CHECKPOINTS ARE SET FOR WHICHEVER IS SMALLER, THE ACCUMULATION TIME FOR A PREDETERMINED DIFFERENCE AMOUNT OR A PREDETERMINED TIME $t_m$.
* THE REDUCTION IN THE ROLLBACK TIME IS = $t_{ci+2} - t_m$.

FAULT-TOLERANT COMPUTER SYSTEM, FAULT-TOLERANT COMPUTER SYSTEM CONTROL METHOD AND RECORDING MEDIUM STORING CONTROL PROGRAM FOR FAULT-TOLERANT COMPUTER SYSTEM

This application is based on Japanese Patent Application No. 2011-087745 filed on Apr. 11, 2011 and including specification, claims, drawings and summary. The disclosure of the above Japanese Patent Application is incorporated herein by reference in its entirety.

TECHNICAL FIELD

The present invention relates to a fault-tolerant computer system, a fault-tolerant computer system control method and a recording medium storing control program for fault-tolerant computer system.

BACKGROUND ART

In recent years, virtualization technology that makes it possible to operate a plurality of Operating Systems (OS) on a physical machine has been widely used. For achieving a virtual machine, there is a method wherein a layer is created in the OS (host OS) that operates on a typical physical machine for operating a virtual machine, and there is a method of creating a layer (hypervisor) on the hardware for operating a virtual machine without going through the host OS, and operating a guest OS on that layer.

Japanese Patent No. 4,468,426 discloses a method of collecting synchronization information that was generated for a first virtual machine and that relates to an event that accompanies input to the first virtual machine, and controlling the execution state of the input of a second virtual machine according to that synchronization information so that it is the same as the execution state of the input of the first virtual machine.

Japanese Patent Application No. 2009-080692 discloses a method wherein, when failure occurs in a server computer on which a virtual machine is operating, the virtual machine is reproduced on another server computer based on a snapshot that was obtained by a disk drive at the closest point in time to the time when the failure occurred. This snapshot is CPU context of the computer that is operating and data inside the memory for processing that is used when that CPU is operating, and data inside the disk drive that is extracted at predetermined timing (check point).

Japanese Patent Application No. 2008-033483 discloses a method wherein, when failure occurs, the list of files included in a copy image on the disk of a first computer and the execution context of the computer are copied to a second computer, that list of files is then referenced in order to copy the copy image from the disk of the first computer to the disk of the second computer.

SUMMARY

An exemplary object of the present invention is to provide a low-power consuming fault-tolerant computer system, a fault-tolerant computer system control method and recording medium storing control program for fault-tolerant computer system capable of quick and simple system switching.

In order to accomplish the exemplary object above, the fault-tolerant computer system of a first exemplary aspect of the present invention is a fault-tolerant computer system that includes a first computer that includes a first memory and a first transfer unit, and operates a virtual machine including a guest OS; and a second computer that includes a second memory and a second transfer unit that receives data that is transferred from the first transfer unit; wherein the first computer includes a first snapshot manager that, together with acquiring a snapshot of the virtual machine at each predetermined first timing, causes to save a difference information in the first memory of a snapshot of the virtual machine at the first timing from one previous first timing, and sends an instruction to the first transfer unit to transfer the difference information that is saved in the first memory to the second memory via the first transfer unit and the second transfer unit; and the second computer includes a second snapshot manager that, together with generating the snapshot based on the difference information that was transferred to the second memory via the first transfer unit and the second transfer unit and saving that snapshot in the second memory, activates a guest OS by the second computer at a predetermined second timing based on the snapshot that was saved in the second memory.

The control method for a fault-tolerant computer system of a second exemplary aspect of the present invention is a control method for a fault-tolerant computer system that includes a first computer that includes a first memory and a first transfer unit, and operates a virtual machine comprising a guest OS, and a second computer that includes a second memory and a second transfer unit that receives data that is transferred from the first transfer unit;

acquiring a snapshot of the virtual machine at each predetermined first timing, and saves a difference information in the first memory of a snapshot of the virtual machine at the first timing from one previous first timing, transferring the difference information that is saved in the first memory to the second memory via the first transfer unit and the second transfer unit;

generating a snapshot based on the difference information that was transferred to the second memory, and saves that snapshot in the second memory; and activating a guest OS by the second computer at a predetermined second timing based on the snapshot that was saved in the second memory.

The recording medium storing control program for fault-tolerant computer system of a third exemplary aspect of the present invention is a non-transitory recording medium that stores a control program for a fault-tolerant computer system that includes a first computer that includes a first memory and a first transfer unit, and operates a virtual machine comprising a guest OS, and a second computer, and causes the first computer to acquire a snapshot of the virtual machine at each predetermined first timing, and save a difference information in the first memory of a snapshot of the virtual machine at the first timing from one previous first timing, and transfer the difference information that is saved in the first memory to the second computer via the first transfer unit.

The recording medium storing control program for fault-tolerant computer system of a fourth exemplary aspect of the present invention is a non-transitory recording medium that stores a control program for a fault-tolerant computer system that includes a first computer that operates a virtual machine comprising a guest OS, and a second computer that includes a second transfer unit that receives data that is transferred from the first computer and a second memory that saves the transferred data; wherein the transferred data are a difference information of snapshots of the virtual computer; the non-transitory recording medium that stores a control program for a fault-tolerant computer system that causes the second computer to generate a snapshot based on the difference information that was saved in the second memory, and save that snapshot in the second memory, and activate a guest OS at a predetermined second timing based on the snapshot that was saved in the second memory.

The fault-tolerant computer system of a fifth exemplary aspect of the present invention is a fault-tolerant computer system that includes a first computer that includes a first memory and first transfer means, and operates a virtual machine comprising a guest OS; and a second computer that includes a second memory and second transfer means that receives data that is transferred from the first transfer means; wherein the first computer includes a first snapshot managing means that, together with acquiring a snapshot of the virtual machine at each predetermined first timing, causes to save a difference information in the first memory of a snapshot of the virtual machine at the first timing from one previous first timing, and sends an instruction to the first transfer means to transfer the difference information that is saved in the first memory to the second memory via the first transfer means and second transfer means; and the second computer includes a second snapshot managing means that, together with generating the snapshot based on the difference information that was transferred to the second memory via the first transfer means and the second transfer means and saving that snapshot in the second memory, activates a guest OS by the second computer at a predetermined second timing based on the snapshot that was saved in the second memory.

BRIEF DESCRIPTION OF THE DRAWINGS

These objects and other objects and advantages of the present invention will become more apparent upon reading of the following detailed description and the accompanying drawings in which:

FIG. 2 is a block diagram illustrating an example of the construction of a fault-tolerant computer system of an exemplary embodiment;

FIG. 3A is a flowchart illustrating process A of an active system of the computer switching process of a fault-tolerant computer system of an exemplary embodiment;

FIG. 3B is a flowchart illustrating process B of an active system of the computer switching process of a fault-tolerant computer system of an exemplary embodiment;

EXEMPLARY EMBODIMENTS

Figure 1:
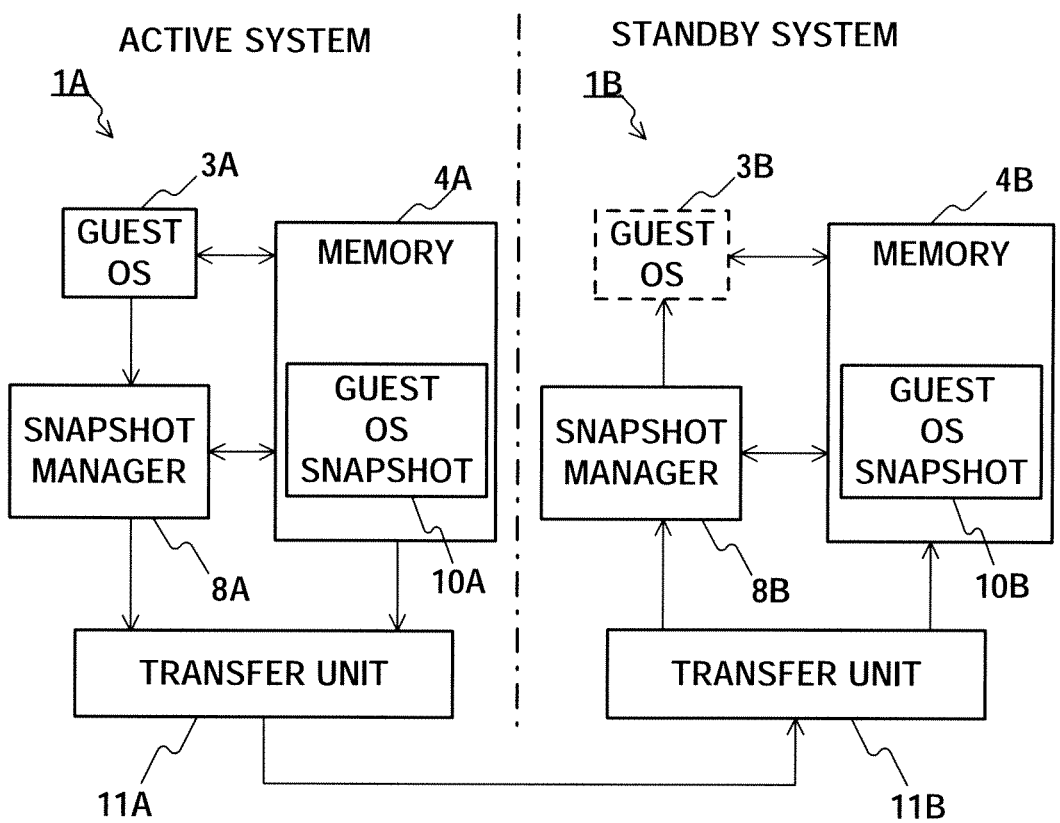
FIG. 1 is a block diagram illustrating an example of the minimum construction of a fault tolerant computer system of an exemplary embodiment of the present invention.

The fault-tolerant computer system of this embodiment of the present invention includes at least two physical machines and is comprised such that virtual machines operate on each physical machine. In the following, an example in which the system has two physical machines will be explained. Here, the term physical machine is for distinguishing the machine from a virtual machine, and means an actual computer. FIG. 1 and FIG. 2 illustrate examples of the construction of a fault-tolerant computer system. As illustrated in FIG. 1 and FIG. 2, one of the two physical machines of the fault-tolerant computer system is called active system 1A, and the other is called standby system 1B. The active system 1A is a computer that has a virtual machine that is operating and providing a service to a user. The standby system 1B is a computer that has a virtual machine that is waiting to start operation when failure occurs and the system is switched (failed over). The component elements of the virtual machines in both systems are basically the same.

First, FIG. 1 will be explained. FIG. 1 illustrates an example of the minimum construction of a fault-tolerant computer system of an exemplary embodiment of the present invention.

The active system 1A comprises a host OS (omitted in the figure), a guest OS 3A, a memory 4A, a snapshot manager 8A and a transfer unit 11A, and by the operation of the guest OS 3A, functions as a virtual machine.

The standby system 1B comprises a host OS (omitted in the figure), a memory 4B, a snapshot manager 8B and a transfer unit 11B, and operates as an actual computer. The guest OS 3B does not operate at first, so is illustrated by a dashed line.

The memory 4A can be accessed from both the host OS and the guest OS 3A. The memory 4B can be accessed from the host OS of the standby system 1B. After the guest OS 3B has been activated in the standby system 1B, the memory 4B can also be accessed from the guest OS 3B.

The snapshot manager 8A is operated on the host OS and guest OS 3A, and the difference information of a snapshot of the guest OS 3A, which will be described later, saves at predetermined timing in the memory 4A as a guest OS snapshot 10A. A snapshot is a matter that stores structures of storage (memory and the like) and files and the execution state of processing at a certain point.

The transfer unit 11A transfers the guest OS snapshot 10A that is stored in the memory 4A to the standby system 1B.

The transfer unit 11B receives the guest OS snapshot 10A that was transferred from the transfer unit 11A, and saves that guest OS snapshot 10A in memory 4B as guest OS snapshot 10B.

The snapshot manager 8B is operated on the Host OS, and based on the guest OS snapshot 10B that is stored in memory 4B, generates a complete guest OS snapshot 10B that is integrated with the difference information, and saves that complete guest OS snapshot 10B in memory 4B.

Moreover, the snapshot manager 8B, when it was determined at predetermined timing, which will be described later, that the active system 1A stopped, for example, activates a predetermined program, and activates the guest OS 3B based on this complete guest OS snapshot 10B. Due to the activation of the guest OS 3B, the standby system 1B begins to operate as the active system 1A in which the virtual machine functions.

FIG. 2 illustrates active system 1A and standby system 1B in more detail than in FIG. 1. In FIG. 2, the host OS 2A, 2B are illustrated. This exemplary embodiment will be explained in detail according to FIG. 2.

The active system 1A comprises a host OS 2A that manages the operation of the active system 1A, a guest OS 3A, which is the OS of the virtual machine, a memory 4A that can be accessed from both the host OS 2A and the guest OS 3A, a FT (Fault Tolerant) module 5A, a RDMA (Remote Direct Memory Access) driver 6A and a data transfer unit 7A. The CPU (Central Processing Unit, omitted in the figure) of the hardware of the active system 1A functions as the guest OS 3A and host OS 2A by using RAM (Random Access Memory), ROM (Read Only Memory) and/or the like and executing predetermined programs for each. The same is true for the FT module 5A and RDMA (Remote Direct Memory Access) driver 6A. The RDMA driver 6A and data transfer unit 7A form the transfer unit 11A. The host OS 2A and the guest OS 3A are connected via a hypervisor, for example. Depending on the method used for the virtual machine, instead of being connected by a hypervisor, the guest OS 3A can be operated on the host OS 2A.

The standby system 1B comprises a host OS 2B that manages the operation of the standby system 1B, a memory 4B that can be accessed by both the host OS 2B and activated guest OS 3B, a FT module 5B, a RDMA driver 6B and a data transfer unit 7B. The CPU of the hardware of the standby system 1B functions as the guest OS 3B and host OS 2B by using RAM. ROM (both omitted in the figure) and/or the like and executing a predetermined program for each. The same is true for the FT module 5B and the RDMA driver 6B. The guest OS 3B is not activated yet. Therefore, the guest OS 3B is indicated with a dashed line in FIG. 2. The RDMA driver 6B and the data transfer unit 7B form the transfer unit 11B.

Both the transfer unit 11A and the transfer unit 11B comprise a communication unit, and the active system 1A and standby system 1B are connected together via those communication units. More specifically, the data transfer units 7A and 7B are connected by a communication line, and data and various kinds of information can be exchanged over that communication line.

The memories 4A, 4B are memory devices of the physical machines, and are main memory devices, for example, that are capable of writing or reading information at higher speed than an external storage such as a disk drive that is often used currently. The memories 4A, 4B store programs that are being executed, data and guest OS snapshots, which will be described later.

The FT module 5A is a module that has a function for making possible a fault-tolerant computer system. The FT module 5A comprises a snapshot manager 8A and error handler 9A, and is operated on the host OS 2A. In other words, the CPU of the active system 1A functions as the snapshot manager 8A and error handler 9A on host OS 2A by executing programs related to each.

The snapshot manager 8A manages check points, acquires and manages change (rewritten) information for the saved contents in the memory that the guest OS 3A uses and manages, and sets the interval for transferring guest OS snapshots 10A (described later). Moreover, the snapshot manager 8A, in accordance to the set transfer interval, sets the contents of the guest OS snapshot 10A that will be saved in memory 4A and saves the results in memory 4A, and gives an instruction to transfer the guest OS snapshot 10A that is saved in the memory 4A to the RDMA driver 6A.

The method for acquiring change information for the contents saved in the memory that guest OS 3A uses and manages from the dirty page flag of the memory 4A that the CPU manages is a typically know acquisition method, so an explanation about the details of the specific acquisition method is omitted.

The guest OS snapshot 10A is a snapshot of the computer that is operated on the guest OS. Also, a dirty page flag is a flag that indicates that data is changed but not saved.

The error handler 9A, in order to notify the standby system 1B as quickly as possible that there is failure with the active system 1A, sends error information for switching systems to the standby system 1B via the RDMA driver 6A and data transfer unit 7A. In order to detect failure in the active system 1A, the standby system 1B may use a heartbeat signal, for example. In that case, the error handler 9A sends a heartbeat signal at a constant period to the standby system 1B via the data transfer unit 7A. In the case that the heartbeat signal did not come at a fixed interval, the data transfer unit 7B of the standby system 1B determines that failure occurred, or in other words, determines that operation of the active system 1A has stopped.

The RDMA driver 6A is operated on the host OS 2A. The RDMA driver 6A receives an instruction from the FT module 5A and controls the data transfer unit 7A so that the data transfer unit 7A transfers error information or a guest OS snapshot 10A that is saved in the memory 4A to the standby system 1B. The instruction from the FT module 5A is a transfer instruction from the snapshot manager 8A to transfer a guest OS snapshot 10A, or an instruction from the error handler 9A to transfer error information.

The data transfer unit 7A is formed using hardware, and according to control from the RDMA driver 6A, transfers a guest OS snapshot WA or error information to the standby system 1B. More specifically, the data transfer unit 7A receives addresses and lengths, which are necessary information for copying contents stored in memory, and error information from the RDMA driver 6A and transfers data according to that data. Transferring a guest OS snapshot 10A is executed by a background process of the guest OS 3A.

The data transfer unit 7B saves the guest OS snapshot 10A that was transferred from the data transfer unit 7A in the memory 4B as a guest snapshot 10B, and notifies the RDMA driver 6B that the transfer is finished. The data transfer unit 7B also sends error information that was similarly transferred from the data transfer unit 7A, or error information that was detected by the data transfer unit 7B itself to the RDMA driver 6B.

The data transfer rate between the data transfer unit 7A and transfer unit 7B affects the settable checkpoint interval. A checkpoint is timing for saving a guest OS snapshot 10A in the memory 4A, and here, is the timing at which a guest OS snapshot 10A is transferred to the standby system 1B.

On the other hand, the rollback time, which is time that indicates how far back in time the processing that is in progress during switching of computers is to be returned, is affected by the checkpoint interval.

In order to reduce the rollback time as much as possible, it is necessary to make the checkpoint interval small. Therefore, when connecting the data transfer units 7A, 7B, using high-speed hardware with a fast data transfer rate is preferred. This connection is possible via a typical network (with the present technology, a 1 gigabit or 10 gigabits network); however, using special hardware for performing high-speed DMA (Direct Memory Access) via an IO slot, such as PCI Express is also possible. Alternatively, a method is also possible in which CPUs are directly connected without going through an I/O (Input/Output) slot.

The RDMA driver 6B sends the notification from the data transfer unit 7B to the FT module 5B.

The FT module 5B, as in the active system 1A, is a module with a function for making possible a fault-tolerant computer system. The FT module 5B comprises a snapshot manager 8B and error handler 9B, and is operated on the host OS 2B.

The snapshot manager 8B and error handler 9B receive a transferred finished notification that the guest OS snapshot 10A was saved in the memory 4B as a guest OS snapshot 10B, or receive an error information, and perform the following processing.

The error handler 9B receives the error information, determines whether failure occurred, or in other words, determines whether or not operation of the active system 1A has stopped, and when the judgment result is that the operation has "stopped", outputs a system switching signal to the snapshot manager 8B and activates the guest OS 3B. For example, when a heartbeat signal is used, the error handler 9B, by way of the RDMA driver 6B, determines that failure has occurred in the active system 1A when a heartbeat signal did not come from the active system 1A at a fixed time or more, and executes error processing.

The snapshot manager 8B receives the finished notification that a guest OS snapshot 10A was saved in the memory 4B as a guest OS snapshot 10B, and by combining that guest OS snapshot 10B with the guest OS snapshots 10B that have been saved in the memory 4B up to that time, saves the result as an updated complete guest OS snapshot 10B in the memory 4B. Moreover, the snapshot manager 8B receives a switching signal from the error handler 9B, and by activating the program for activating the guest OS 3B, activates the guest OS 3B based on the guest OS snapshot 10B that is saved in the memory 4B. After the guest OS 3B has been activated, the standby system takes over for the active system and executes the contents that the snapshot manager 8A was executing in the active system 1A. The host OS 2B and the guest OS 3B, as in the active system 1A, can be connected via a hypervisor, or the guest OS 3B can be operated on the host OS 2B.

Figure 4A:
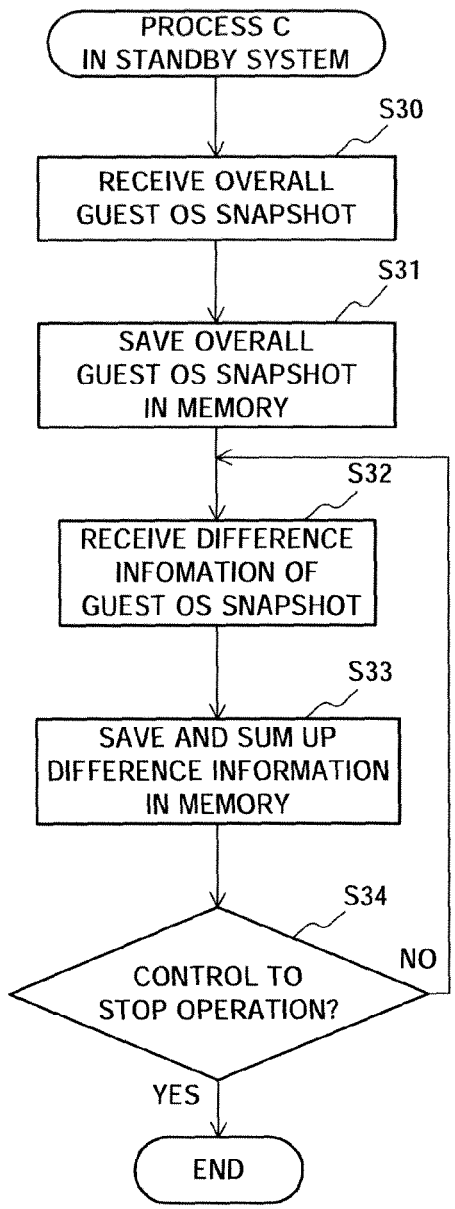
FIG. 4A is a flowchart illustrating process C of a standby system of the computer switching process of a fault-tolerant computer system of an exemplary embodiment.
Figure 4B:
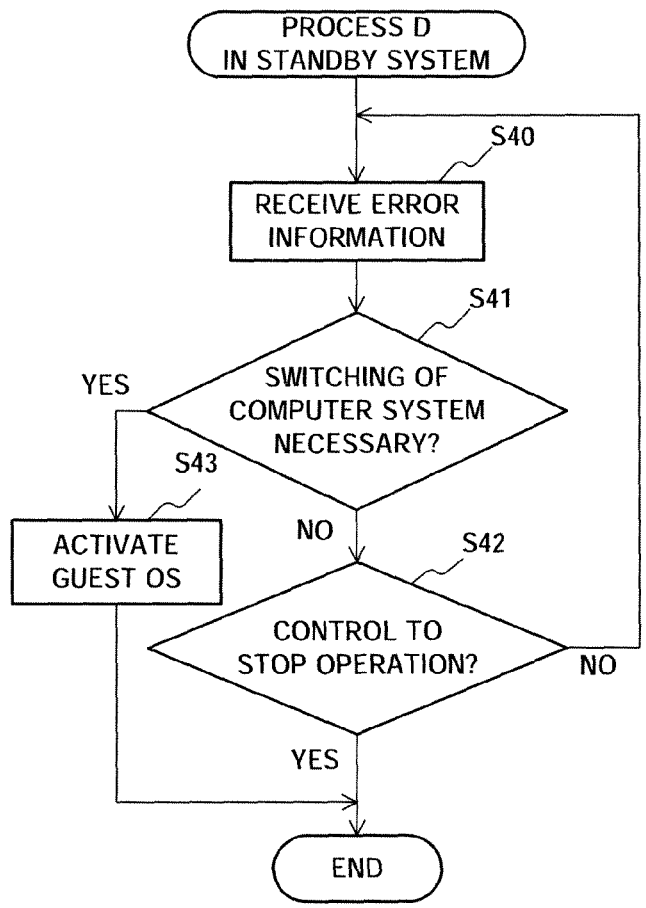
FIG. 4B is a flowchart illustrating process D of a standby system of the computer switching process of a fault-tolerant computer system of an exemplary embodiment.

Next, the computer switching operation of this system will be explained using the flowcharts illustrated in FIG. 3A, FIG. 3B, FIG. 4A and FIG. 4B. FIG. 3A illustrates the contents of process A by the active system 1A. FIG. 3B illustrates the contents of process B by the active system 1A. FIG. 4A illustrates the contents of process C by the standby system 1B. FIG. 4B illustrates the contents of process D by the standby system 1B. Process A and process C are processes in the respective computers when copying a guest OS snapshot 10A from the active system 1A to the standby system 1B. Process B and process D are for the acquisition and transferring of error information by the active system 1A and processing error information by the standby system 1B.

As a precondition, the fault-tolerant computer system, or in other words, active system 1A and standby system 1B are activated. Activation of the active system 1A includes both the host OS 2A and the guest OS 3A being in the operating state. More specifically, in the active system 1A, by turning ON the power, first, the host OS 2A is set in the operating state. The guest OS 3A is then set in the operating state after the host OS 2A is in the operating state. The guest OS 3A can also be set in the operating state by an instruction from the user. On the other hand, in the standby system 1B, by turning ON the power, the host OS 2B is set in the operating state, however, the guest OS 3B is not activated. The active system 1A and the standby system 1B are connected by a communication line.

First, process A by the active system 1A will be explained based on FIG. 3A. After the data transfer unit 7A acknowledges that the hardware of both systems are connected by a communication line, the snapshot manager 8A of the active system 1A creates a snapshot of the overall processing contents of the guest OS 3A and saves that snapshot in the memory 4A as a guest OS snapshot 10A. Moreover, the snapshot manager 8A transfers that guest OS snapshot 10A to the standby system 1B via the transfer unit 11A, or in other words, via the RDMA driver 6A and data transfer unit 7A (step S10). A snapshot of the overall processing contents of the guest OS 3A includes all of the files that are used by the guest OS 3A, the contents of the processing memory at a predetermined point in time, and the context of the CPU. The method for copying the overall processing contents of the guest OS 3A to another system is used in the migration processing of the virtual environment and is well known, so an explanation of that method is omitted.

Next, at a predetermined time, the snapshot manager 8A of the active system 1A acquires and accumulates change information related to the contents of the guest OS snapshot 10A (step S11). The point in time when this predetermined time elapses is called a checkpoint (this will be described in detail later). The starting point of the first checkpoint is the point in time when the overall snapshot of the processing contents of the guest OS 3A was created. In other words, at each checkpoint, the snapshot manager 8A acquires and accumulates the portion of change in the guest OS snapshot 10A from the starting point or previous checkpoint up to that checkpoint.

Next, in the active system 1A, the snapshot manager 8A, for example, performs checkpoint determination (step S12). Checkpoint determination is a determination for determining whether or not the amount of time that has elapsed from the starting point of a checkpoint or from the previous checkpoint has reached a predetermined time, or in other words whether or not the next checkpoint has been reached. The setting of checkpoints will be described in detail later.

When a checkpoint has not been reached (step S12: NO), processing returns to the processing of step S11. When a checkpoint has been reached (step S12: YES), the snapshot manager 8A saves the accumulated change information to which processing memory contents and CPU context information at that checkpoint have been added in the memory 4A as difference information, and outputs an instruction to the RDMA driver 6A to transfer this difference information to the standby system 1B. After receiving this instruction, the RDMA driver 6A performs control to transfer the difference information saved in the memory 4A to the standby system 1B via the data transfer unit 7A (step S13).

After that, whether or not control was performed to stop operation is determined (step S14). When there was control to stop operation (step S14: YES), processing ends. When there was no control to stop operation (step S14: NO), processing returns to step S11, and processing continues. Stopping operation referred to here is stopping operation by control from the user, and is not the stopping of operation due to some kind of failure.

Next, the processing B in the active system will be explained based on FIG. 3B. In the active system 1A, the error handler 9A acquires error, information, and transfers the error information to the standby system 1B via the data transfer unit 7A (step S20).

After that, it is determined whether control was performed to stop operation (step S21). When control has been performed to stop operation (step S21: YES), processing ends. When there was no control to stop operation (step S1: NO), processing returns to step S20, and processing continues. Stopping operation referred to here is stopping operation by control from the user, and is not the stopping of operation due to some kind of failure. This process B is performed in parallel with the process A described above.

Next, the contents of process C in the standby system 1B will be explained based on FIG. 4A. In the standby system 1B, the overall information of the guest OS snapshot 10A that was transferred from the active system 1A in step S11 of FIG. 3A is received by the transfer unit 11B, or in other words, is received by the data transfer unit 7B (step S30). Then, according to control from the RDMA 6B, that information is saved in the memory 4B as a guest OS snapshot 10B (step S31). By doing so, the overall information of the guest OS snapshot 10A is completely copied from the active system 1A to the standby system 1B.

After that, in the standby system 1B, the difference information that was transferred from the active system 1A in step S13 in FIG. 3A is received by the transfer unit 11B, or in other words, by the data transfer unit 7B (step S32). Then, according to control from the RDMA 6B, that difference information is saved in the memory 4B. The data transfer unit 7B sends a notification to the snapshot manager 8B via the RDMA driver 6B indicating that saving the difference information in the memory 4B is finished. After receiving this, the snapshot manager 8B sums up the difference information that was saved this time to the guest OS snapshot 10B that was saved up to this point, or writes over that guest OS snapshot 10B to generate one complete guest OS snapshot 10B, and saves that complete guest OS snapshot 10B in the memory 4B (step S33).

After that, in the standby system 1B, it is determined whether or not control was performed to stop operation of the system (step S34). When there was control to stop the operation (step S34: YES), the standby system ends processing. When there was no control to stop operation (step S34: NO), processing returns to step S32, and processing continues. As in the explanation of system 1A, stopping operation referred to here is stopping operation according to control from the user, and is not the stopping of operation due to some kind of failure.

Next, process D in the standby system 1B will be explained based on FIG. 4B. In the standby system 1B, the data transfer unit 7B receives error information that is transferred from the active system 1A in step S20 in FIG. 3B (step S40). The error handler 9B, based on the error information, detects the occurrence of failure in the active system 1A, and determines whether or not it is necessary to switch computers (step S41).

When heartbeat signals are used as error information, the data transfer unit 7A sends heartbeat signals to the standby system 1B (step S20 in FIG. 3B). In this case, step S41 is a process wherein the error handler 9B detects whether a heartbeat signal arrived in a predetermined time or more. For the detection result, the error handler 9B determines whether or not failure occurred in the active system 1A, and determines whether or not it is necessary to switch computers (step S41).

When it was determined that it is not necessary to switch computers (step S41: NO), in the standby system 1B, it is determined whether or not there was a control to stop operation of the system (step S42). When there was control to stop operation (step S42: YES), the standby system 1B ends the process illustrated in FIG. 4B, and when there was no control to stop processing (step S42: NO), processing returns to step S40, and processing continues.

In the standby system 1B, when the error handler 9B determined that it is necessary to switch computers (step S41: YES), the error handler 9B instructs the snapshot manager 8B to switch computers. According to this instruction, the snapshot manager 8B activates the guest OS 3B based on the guest OS snapshot 10B that is saved in the memory 4B (step S43), and ends the processing illustrated in FIG. 4B. This guest OS 3B is the same as the guest OS 3A of the point in time when previously copied from the active system 1A. When copying of the guest OS snapshot 10A is in progress, the case wherein the restoration of the guest OS 3B is not sufficient is possible. Therefore, preferably a plurality of copies of the guest OS 3A that the snapshot manager 8A manages is created, and one guest OS snapshot 10B is maintained in the complete state, so that the guest OS 3B is always activated using a complete and new guest OS snapshot 10B. By activating the guest OS 3B, the standby system 1B starts operation as a virtual machine. The guest OS 3B then continues executing the processing contents at the point in time when the guest OS snapshot 10A corresponding to the guest OS snapshot 10B that was used to activate the guest OS 3B was created. When doing this, the screen and keyboard connection of the physical machine are also suitably performed. Process D in FIG. 4B is performed in parallel with the process C in FIG. 4A.

After operation of the active system 1A stops due to failure, and the standby system 1B begins to function as the active system, the standby system executes the same processing as the active system 1A, including the process contents illustrated in FIG. 3A and FIG. 3B. On the other hand, after operation of the active system was stopped due to failure, and then was reactivated after the failure was recovered, the active system 1A becomes the standby system and executes the process illustrated in FIG. 4A and FIG. 4B.

Next, checkpoints will be explained. Setting checkpoints is greatly related to the rollback time when continuing processing by a computer. When the rollback time is long, during the time corresponding to the rollback when continuing processing in the standby system, the same processing is repeated two times. For example, failure occurs when a user is watching a video, the video appears to rewind and played again. Therefore, it is important to make the rollback time as short as possible. The rollback is set with the checkpoint as an object.

In this embodiment, at first, transferring the overall snapshot of the processing contents of the guest OS 3A to the standby system 1B takes time. However, after that, the difference information is transferred to the standby system 1B at each checkpoint, so the transfer time is shorter. Therefore, it is possible to make checkpoint interval smaller, and the rollback time can be made shorter by that amount. Moreover, the difference information is not transferred all at once when failure occurs, but is transferred at each predetermined checkpoint, so that shortening the time required for switching computers is promoted.

Setting checkpoints will be explained for three cases.

Figure 5:
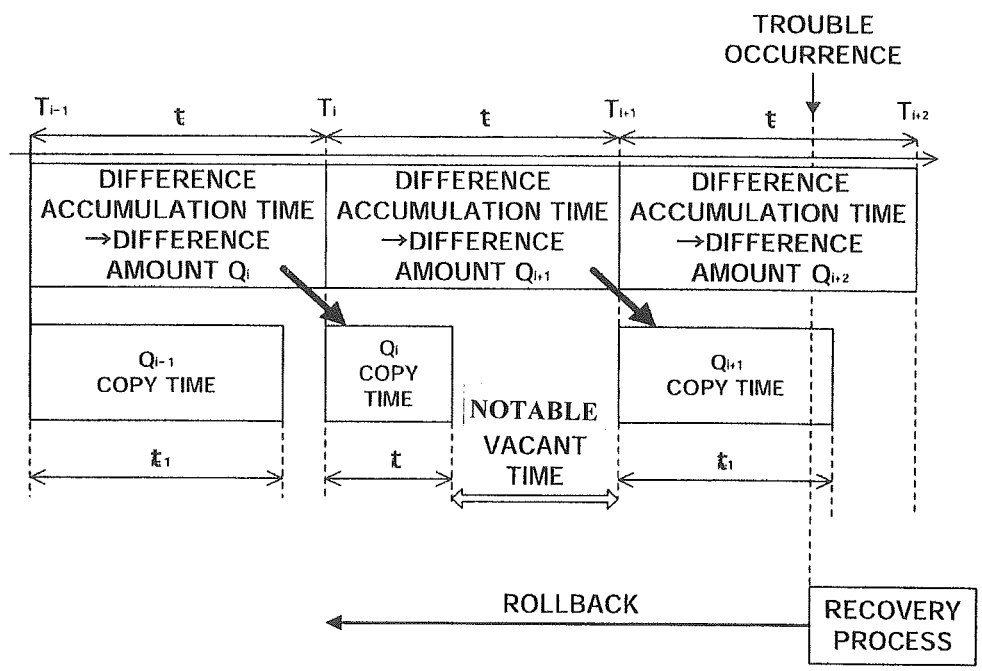
FIG. 5 is a diagram illustrating an example of setting checkpoints of the computer switching process of a fault-tolerant computer system of an exemplary embodiment.

In case 1, for example, a checkpoint is set as the point in time when the snapshot of the overall processing contents of the guest OS is created for the first time, and after that checkpoints are set at every set amount of time. FIG. 5 is a diagram for explaining case 1. The horizontal axis in the figure is the time axis. In the figure, $T_{i-1}$, $T_i$, $T_{i+1}$ are checkpoints. The interval between checkpoints is a fixed time $t_c$. A difference amount $Q_i$ (change information) that is saved in the memory 4A as the amount of change in the contents from checkpoint $T_{i-1}$ to checkpoint $T_i$, or in other words, difference information that includes a guest OS snapshot 10A corresponding to the difference in memory when there was a dirty page, is transferred to the standby system 1B and copied into the memory 4B. This copy time is set nearly by the transfer time, and depends on the amount of difference that is the transfer object. The difference amount is the amount stored at each respective time $t_c$, so this amount changes at each checkpoint. Therefore, the interval $t_c$ between checkpoints is set longer than the estimated maximum transfer time.

In case 1, only the difference information is transferred, so when compared with the case of transferring the overall processing contents of the guest OS each time, the amount of transferred information is smaller, and thus the transfer time becomes shorter. Therefore, it is possible to make the checkpoint interval smaller, and thus it is possible to shorten the rollback time. However, there are problems such as the following.

For example, in FIG. 5, it is detected that failure occurred in the active system 1A at the point in time indicated by the arrow as "failure occurrence", and at that point, the process for switching computers, or in other words, the system recovery process is started. At this time, the most recent guest OS snapshot 10B that is saved in the memory 4B is the snapshot that was acquired at checkpoint $T_i$, in other words, is the portion of the amount of difference $Q_i$, so that the rollback that is necessary for the recovery process is the point in time $T_i$ that is indicated as "rollback" by the arrow in FIG. 5. When the amount of difference $Q_i$ at this time is small, the amount of time $t_i$ required for copying that difference may be much smaller than the time $t_c$ between checkpoints. In that case, there is a notable amount of vacant time $t_c-t_i$, and becomes an unnecessary rollback time.

Figure 6:
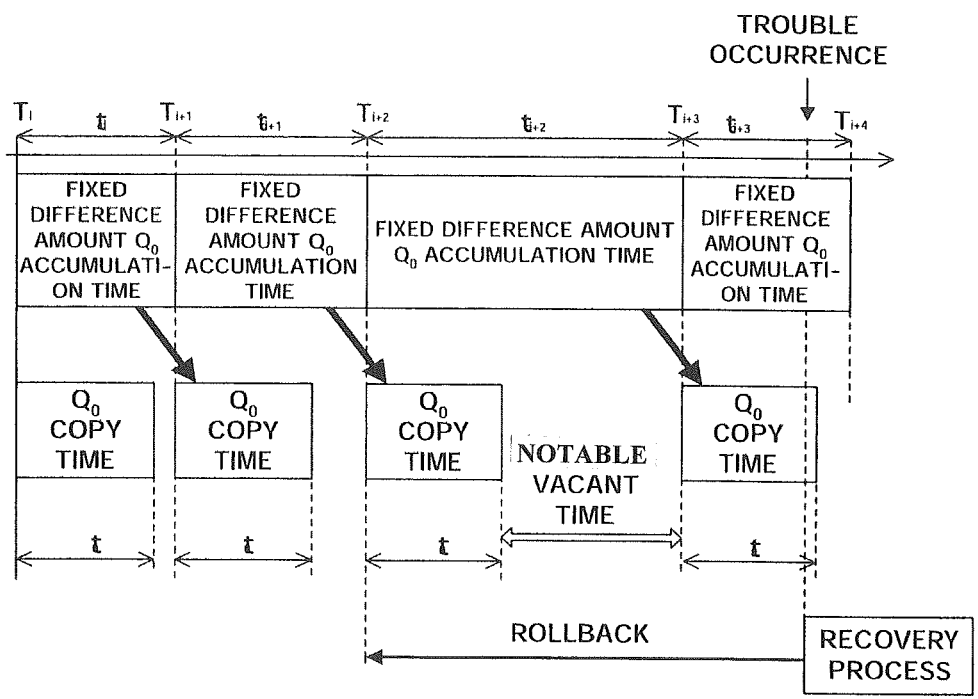
FIG. 6 is a diagram illustrating another example of setting checkpoints of the computer switching process of a fault-tolerant computer system of an exemplary embodiment.

In order to solve such a problem, checkpoints can be set based on a set amount of difference being accumulated. This is case 2. FIG. 6 illustrates an example of case 2. In Case 2, the amount of difference is fixed, so the copy time is a fixed amount of time and does not depend on the checkpoints, however, the time required to accumulate the predetermined amount of difference differs according to the period, so the checkpoint interval differs in length.

In this case, the checkpoints are set according to the amount of difference, so that the problem of vacant time that occurred in case 1 does not occur. However, when the amount of difference before failure occurs is small, and it takes a long time ($t_{Ci+2}$) to accumulate the predetermined amount, the rollback time goes back one previous checkpoint $T_{i+2}$ before the checkpoint $T_{i+3}$ nearest to when failure occurred, so there are times when the rollback time may become greater than when the checkpoints are set at each set amount of time.

Figure 7:
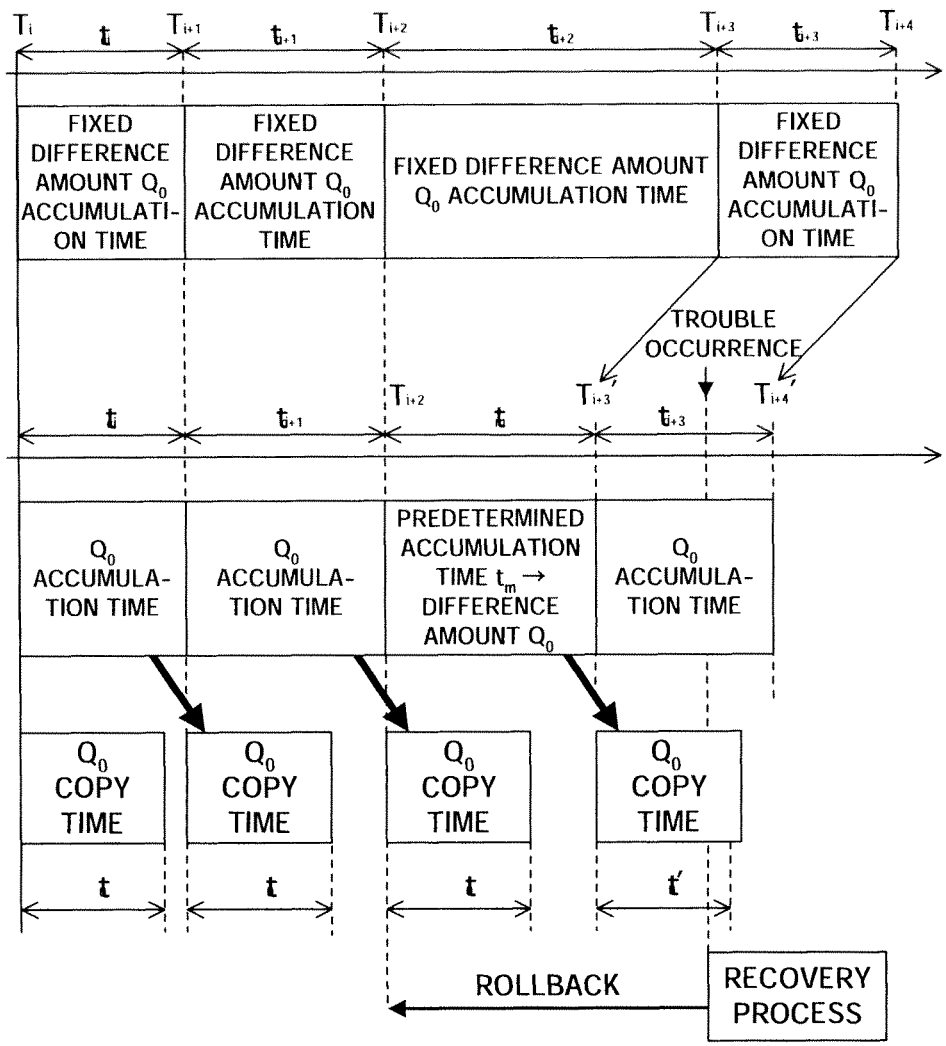
FIG. 7 is a diagram illustrating another example of setting checkpoints of the computer switching process of a fault-tolerant computer system of an exemplary embodiment.

FIG. 7 illustrates case 3 of a method for setting checkpoints in order to solve this problem. Basically, the way of thinking is the same as in case 2, however, a maximum value $t_m$ is set for the time between checkpoints, and when the time exceeds this time, a checkpoint is set at the point $t_m$ from the previous checkpoint. The top of FIG. 7 corresponds to case 2 in FIG. 6, and below that is for case 3 when a maximum time $t_m$ is set between checkpoints. The rollback time here only goes back a time $t_m$ from the nearest checkpoint $T_{i+3}'$ to when failure occurred, and when compared with case 2, the time $T_{ci+2}-t_m$ becomes the reduction in the rollback.

An example was given for the case of using a heartbeat signal as the method of detection of failure by the error handlers 7A, 7B. However, in this method alone, when time service is stopped is the worst case, the time of the heartbeat signal interval is added to the rollback time of the checkpoint. As in this exemplary embodiment, when failure occurs and it is necessary to continue the processing of the active system 1A by the standby system 1B in a short time, it is also possible to detect errors that could be related to future computer stoppage, and to notify the standby system 1B using error information that includes that information. As a result, the error handler 9B of the standby system 1B can determine that in the active system 1A the system will go down in the near future and can startup the guest OS 3B. By doing so, the fault-tolerant computer system is able to switch the systems before the system stops.

In order to perform this kind of failure detection, an example of collecting trends of collectable errors of the memory 4A is feasible. When error information that corresponds to a collectable error trend is detected, there is a probability that there is some kind of memory failure, so it is possible to determine that there is a possibility that the system will go down in the near future. It is possible for the error handlers 9A, 9B to handle various kinds of errors.

In the explanation above, it is not absolutely necessary that the error handlers 9A, 9B be included in the FT modules 5A, 5B. For example, as illustrated in the example in FIG. 8, the error handlers 9A, 9B could be included in the data transfer units 7A, 7B.

Figure 8:
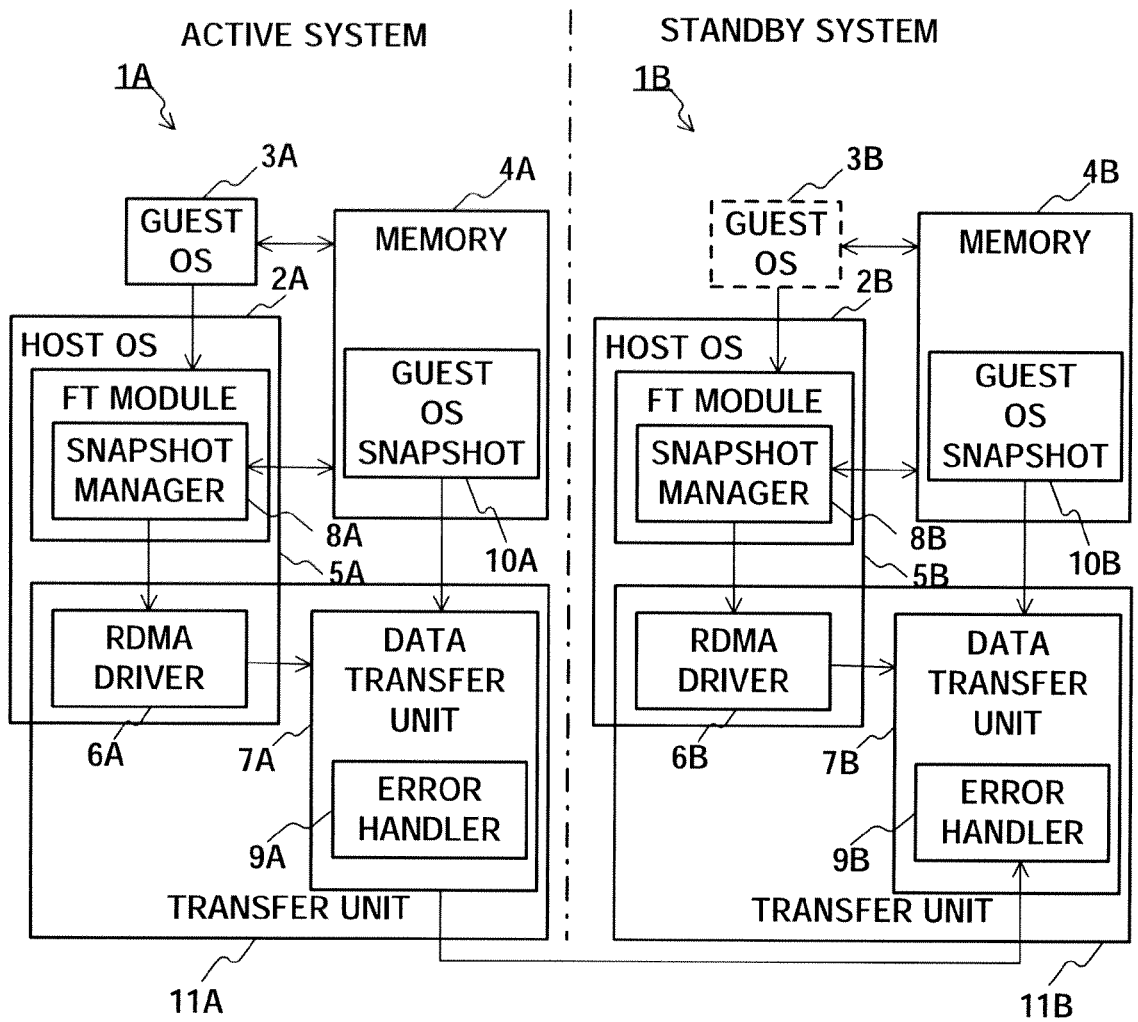
FIG. 8 is a block diagram illustrating an example of a variation of construction of a fault-tolerant computer system of an exemplary embodiment.

In the construction illustrated in FIG. 8, it is possible to dynamically embed error information that was detected by the error handler 9A in the error information bits that are provided in the data that is transferred via the data transfer units 7A, 7B. As a result, it is possible to more quickly notify the standby system 1B of error information.

The fault-tolerant computer system of the exemplary embodiment is constructed as described above, so special hardware is not used. Therefore, it is possible to construct a system simply and inexpensively.

Moreover, at each checkpoint, a guest OS snapshot 10A is copied in the form of difference information to the memory 4B of the standby system 1B as a guest OS snapshot 10B, and integrated with the snapshot copied to that point and saved. Therefore, when failure occurs in the active system 1A, it is possible for the standby system 1B activate at high speed the guest OS 3B regardless of the size of the memory area assigned to the guest OS 3A, and to switch the system. Consequently, in a software-controlled fault-tolerant computer system, it is possible to shorten the failover time more than in the conventional example, and thus it is possible to perform recovery quickly after failure occurs.

The guest OS snapshot 10A in the form of difference information is directly copied from the memory 4A to the memory 4B, which are main memory devices, so copying can performed at higher speed than when copying by way of an external memory device such as a disk drive.

Furthermore, the guest OS 3B does not operate until system switching is performed, and only one virtual machine is in the operating state, so when compared with a lockstep type fault-tolerant computer system, it is possible to achieve a fault-tolerant computer system that operates with less power consumption.

Moreover, a guest OS snapshot 10A is taken to be difference information, so that when checkpoints are set every fixed time, it is possible to shorten the checkpoint time interval, and thus it is possible to shorten the rollback time when switching systems. For, the user, the rollback time can be considered to included the system switching time, so shortening this time is essentially the same as speeding up system switching.

By setting checkpoints not at every set time, but at points in time where the amount of data of the guest OS snapshot 10A, which is difference information, became a predetermined value, it is possible to improve the problem which existed when setting checkpoints at every fixed time of there being extra rollback time, and thus it is possible to even more substantially speed up the system switching time.

Furthermore, checkpoints can be set when the amount of data of a guest OS snapshot 10A, which is difference information, becomes a predetermined value, or at a predetermined maximum time interval, whichever is smallest. As a result, it is possible to shorten both the extra rollback time that occurs when the checkpoints are set at every fixed amount of time, or when the checkpoints are set when the amount of difference information reach a predetermined amount, and the rollback time that is longer than a predetermined time. As a result it is possible to even more substantially speed up the system switching time.

The methods of setting the checkpoints as described in cases 1 to 3 above can be applied to a fault-tolerant computer system that does not use virtual machines, with the same effect as described above being obtained in that case as well.

Moreover, in this fault-tolerant computer system, the computer of the standby system takes over and continues the process of the guest OS 3A that is operated by the virtual machine of the active system, so the physical machine used as a base can be any kind of machine. For example, as long as the system satisfies the requirements of the guest OS 3A that is operating, a fault-tolerant computer system can be achieved by at least installing FT modules 5A, 5B and RDMA drivers 6A, 68 in the host OS 2A, 2B.

Furthermore, it is possible to have one physical machine in the standby system for a plurality of physical machines in the active system, and thus it is possible to improve the utilization efficiency of the system, as well as lower cost and power consumption. In other words, in a lockstep type fault-tolerant computer system that operates with duplicate systems, essentially two physical machines are required for one system. For example, in ten fault-tolerant computer systems, hardware for twenty computers is operating. In the fault-tolerant computer system of the exemplary embodiment, there is no need for the computers of the standby system, which is the switching destination, to be a physical pair with that of the active system. Therefore, by concentrating the standby system on one physical machine, ten fault-tolerant computer systems can be constructed with eleven physical machines (ten machines in the active system+one machine in the standby system). Moreover, by using one physical machine as the active system, and using as the standby system of the other machine, it is possible to construct ten fault-tolerant computer systems with a minimum of ten physical machines. In this way, it is possible to construct a system freely using vacant physical machines.

The flowcharts illustrated in FIG. 3A, FIG. 3B, FIG. 4A and FIG. 4B illustrate the contents of the operation of the fault-tolerant computer system of the exemplary embodiment, and also illustrate the contents of the control method and control program of the fault-tolerant computer system.

The control method and control program of the fault-tolerant computer system illustrated in FIG. 3A, FIG. 3B, FIG. 4A and FIG. 4B also have the same effect as the effect described above.

Part or all of the embodiments described above can be described as in the supplementary notes below, but not limited to that below.

(Supplementary Note 1)

A fault-tolerant computer system that includes a first computer that comprises a first memory and a first transfer unit, and operates a virtual machine comprising a guest OS; and a second computer that comprises a second memory and a second transfer unit that receives data that is transferred from the first transfer unit; wherein the first computer comprises a first snapshot manager that, together with acquiring a snapshot of the virtual machine at each predetermined first timing, causes to save a difference information in the first memory of a snapshot of the virtual machine at the first timing from one previous first timing, and sends an instruction to the first transfer unit to transfer the difference information that is saved in the first memory to the second memory via the first transfer unit and the second transfer unit; and the second computer comprises a second snapshot manager that, together with generating the snapshot based on the difference information that was transferred to the second memory via the first transfer unit and the second transfer unit and saving that snapshot in the second memory, activates a guest OS by the second computer at a predetermined second timing based on the snapshot that was saved in the second memory.

(Supplementary Note 2)

In the fault-tolerant computer system according to supplementary note 1, the first memory and the second memory are main memory devices of the first computer and the second computer, respectively.

(Supplementary Note 3)

In the fault-tolerant computer system according to supplementary note 1 or 2, the first transfer unit comprises:

a first data transfer unit that sends data from the first computer, and a first RDMA driver that controls the first transfer unit;

the second transfer unit comprises:

a second data transfer unit that receives data via the first data transfer unit; and a second RDMA driver that controls the second data transfer unit; and according to the control by the first RDMA driver and the second RDMA driver, the difference information is directly transferred from the first memory to the second memory via the first data transfer unit and the second data transfer unit.

(Supplementary Note 4)

In the fault-tolerant computer system according to any one of the supplementary notes 1 to 3, the first computer comprises a first error handler that acquires an error information of the first computer, and sends an instruction to the first transfer unit to transfer the error information to the second computer;

the second computer comprises a second error handler that, based on the error information that was sent via the first transfer unit and received via the second transfer unit, determines whether or not there is failure in the first computer, and when it is determined that there is failure, sends a computer switch notification to the second snapshot manager; and the second timing is when the second snapshot manager received the computer switch notification.

(Supplementary Note 5)

In the fault-tolerant computer system according to supplementary note 4, the first error handler and the second error handler are included in the first data transfer unit and the second data transfer unit, respectively.

(Supplementary Note 6)

In the fault-tolerant computer system according to supplementary note 4 or 5, the error information is an information that can be used to determine that the first computer has stopped.

(Supplementary Note 7)

In the fault-tolerant computer system according any one of the supplementary notes 4 to 6, the error information includes an information that indicates there is a possibility that the first computer will stop.
(Supplementary Note 8)

In the fault-tolerant computer system according to any one of the supplementary notes 1 to 7, the error information includes an information that indicates there is a possibility that the first computer will stop.
(Supplementary Note 9)

In the fault-tolerant computer system according to any one of the supplementary notes 1 to 8, the first timing is set after every fixed amount of time.
(Supplementary Note 10)

In the fault-tolerant computer system according to any one of the supplementary notes 1 to 8, the first timing is set at a point in time when the amount of the difference information has reached a predetermined amount.
(Supplementary Note 11)

In the fault-tolerant computer system according to any one of the supplementary notes 1 to 8, the first timing is set to a point in time when the amount of the difference information reaches a predetermined amount, or when the time that has elapsed since the previous first timing has reached a maximum amount of time, whichever comes first.
(Supplementary Note 12)

A control method for a fault-tolerant computer system that includes a first computer that comprises a first memory and a first transfer unit, and operates a virtual machine comprising a guest OS, and a second computer that comprises a second memory and a second transfer unit that receives data that is transferred from the first transfer unit;

acquiring a snapshot of the virtual machine at each predetermined first timing, and saves a difference information in the first memory of a snapshot of the virtual machine at the first timing from one previous first timing, transferring the difference information that is saved in the first memory to the second memory via the first transfer unit and the second transfer unit;

generating a snapshot based on the difference information that was transferred to the second memory, and saves that snapshot in the second memory; and activating a guest OS by the second computer at a predetermined second timing based on the snapshot that was saved in the second memory.
(Supplementary Note 13)

A non-transitory recording medium that stores a control program for a fault-tolerant computer system that includes a first computer that comprises a first memory and a first transfer unit, and operates a virtual machine comprising a guest OS, and a second computer, and causes the first computer to acquire a snapshot of the virtual machine at each predetermined first timing, and save a difference information in the first memory of a snapshot of the virtual machine at the first timing from one previous first timing, and transfer the difference information that is saved in the first memory to the second computer via the first transfer unit.
(Supplementary Note 14)

A non-transitory recording medium that stores a control program for a fault-tolerant computer system that includes a first computer that operates a virtual machine comprising a guest OS, and a second computer that comprises a second transfer unit that receives data that is transferred from the first computer and a second memory that saves the transferred data; wherein the transferred data are a difference information of snapshots of the virtual computer; the non-transitory recording medium that stores a control program for a fault-tolerant computer system that causes the second computer to generate a snapshot based on the difference information that was saved in the second memory, and save that snapshot in the second memory, and activate a guest OS at a predetermined second timing based on the snapshot that was saved in the second memory.
(Supplementary Note 15)

A fault-tolerant computer system that includes a first computer that comprises a first memory and first transfer means, and operates a virtual machine comprising a guest OS; and a second computer that comprises a second memory and second transfer means that receives data that is transferred from the first transfer means; wherein the first computer comprises a first snapshot managing means that, together with acquiring a snapshot of the virtual machine at each predetermined first timing, causes to save a difference information in the first memory of a snapshot of the virtual machine at the first timing from one previous first timing, and sends an instruction to the first transfer means to transfer the difference information that is saved in the first memory to the second memory via the first transfer means and second transfer means; and the second computer comprises a second snapshot managing means that, together with generating the snapshot based on the difference information that was transferred to the second memory via the first transfer means and the second transfer means and saving that snapshot in the second memory, activates a guest OS by the second computer at a predetermined second timing based on the snapshot that was saved in the second memory.

Having described and illustrated the principles of this application by reference to one or more preferred embodiments, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A fault-tolerant computer system including:
    a first computer that comprises a first memory and a first transfer unit, and operates a virtual machine comprising a guest Operating System (OS); and
    a second computer that comprises a second memory and a second transfer unit that receives data that is transferred from the first transfer unit,
    wherein the first computer comprises a first snapshot manager that, together with acquiring a snapshot of the virtual machine at each predetermined timing at the first computer, saves, in the first memory, difference information of a snapshot of the virtual machine at a first timing from one previous timing, and sends an instruction to the first transfer unit to transfer the difference information that is saved in the first memory to the second memory via the first transfer unit and the second transfer unit,
    wherein the second computer comprises a second snapshot manager that, together with generating a snapshot based on the difference information that was transferred to the second memory via the first transfer unit and the second transfer unit and saving the snapshot generated based on the difference information in the second memory, activates the guest OS in the second computer at a predetermined timing at the second computer based on the snapshot that was saved in the second memory, wherein the first computer comprises a first error handler that acquires an error information of the first computer, and sends an instruction to the first transfer unit to transfer the error information to the second computer, the second computer comprises a second error handler that, based on the error information that was sent via the first transfer unit and received via the second transfer unit, determines whether there is a failure in the first computer, and when it is determined that there is a failure, sends a computer switch notification to the second snapshot manager, and the second timing comprises a time when the second snapshot manager receives the computer switch notification, and wherein the error information includes information that indicates there is a possibility that the first computer will stop.

2. The fault-tolerant computer system according to claim 1, wherein the first memory and the second memory comprise main memory devices of the first computer and the second computer, respectively.

3. The fault-tolerant computer system according to claim 1, wherein the first transfer unit comprises:
 a first data transfer unit that sends data from the first computer; and
 a first Remote Direct Memory Access (RDMA) driver that controls the first transfer unit,
wherein the second transfer unit comprises:
 a second data transfer unit that receives data via the first data transfer unit;
 and a second RDMA driver that controls the second data transfer unit, and
wherein according to the control by the first RDMA driver and the second RDMA driver, the difference information is directly transferred from the first memory to the second memory via the first data transfer unit and the second data transfer unit.

4. The fault-tolerant computer system according to claim 1, wherein the first error handler and the second error handler are included in the first data transfer unit and the second data transfer unit, respectively.

5. The fault-tolerant computer system according to claim 1, wherein the error information is an information that is used to determine that the first computer has stopped.

6. The fault-tolerant computer system according to claim 1, wherein the difference information includes:
 at the first timing, contents of changes to data saved in the first memory that is used by the guest OS that occurred from one previous timing; and
 context information of a Central Processing Unit (CPU) that controls an operation of the guest OS.

7. The fault-tolerant computer system according to claim 1, wherein the first timing is set after every fixed amount of time.

8. The fault-tolerant computer system according to claim 1, wherein each predetermined timing at the first computer is set at a point in time when an amount of the difference information has reached a predetermined amount.

9. A fault-tolerant computer system including:
 a first computer that comprises a first memory and a first transfer unit, and operates a virtual machine comprising a guest Operating System (OS); and
 a second computer that comprises a second memory and a second transfer unit that receives data that is transferred from the first transfer unit,
wherein the first computer comprises a first snapshot manager that, together with acquiring a snapshot of the virtual machine at each predetermined first timing, saves, in the first memory, difference information of a snapshot of the virtual machine at a first timing from one previous timing, and sends an instruction to the first transfer unit to transfer the difference information that is saved in the first memory to the second memory via the first transfer unit and the second transfer unit, wherein the second computer comprises a second snapshot manager that, together with generating a snapshot based on the difference information that was transferred to the second memory via the first transfer unit and the second transfer unit and saving the snapshot generated based on the difference information in the second memory, activates the guest OS in the second computer at a predetermined timing at the second computer based on the snapshot that was saved in the second memory, and wherein each predetermined first timing is set to a point in time when an amount of the difference information reaches a predetermined amount, or when a time that has elapsed since the previous timing has reached a maximum amount of time, whichever comes first.

10. The fault-tolerant computer system according to claim 9,
wherein the first computer comprises a first error handler that acquires an error information of the first computer, and
wherein the error information includes information that indicates there is a possibility that the first computer will stop.

11. The fault-tolerant computer system according to claim 9,
wherein the first computer comprises a first error handler that acquires an error information of the first computer, and sends an instruction to the first transfer unit to transfer the error information to the second computer, and
wherein the error information includes information that indicates there is a possibility that the first computer will stop.

12. The fault-tolerant computer system according to claim 9,
wherein the first computer comprises a first error handler that acquires an error information of the first computer,
wherein the second computer comprises a second error handler that, based on the error information, determines whether there is a failure in the first computer, and
wherein the error information includes information that indicates there is a possibility that the first computer will stop.

13. A control method for a fault-tolerant computer system that includes a first computer that comprises a first memory and a first transfer unit, and operates a virtual machine comprising a guest Operating System (OS), and a second computer that comprises a second memory and a second transfer unit that receives data that is transferred from the first transfer unit, said method comprising:
 acquiring a snapshot of the virtual machine at each predetermined timing at the first computer;
 saving, in the first memory, difference information of a snapshot of the virtual machine at a timing from one previous timing;
 transferring the difference information that is saved in the first memory to the second memory via the first transfer unit and the second transfer unit;
 generating a snapshot based on the difference information that was transferred to the second memory, and saving the snapshot generated based on the difference information in the second memory; and activating the guest OS in the second computer at a predetermined timing at the second computer based on the snapshot that was saved in the second memory, wherein the first computer comprises a first error handler that acquires an error information of the first computer, and sends an instruction to the first transfer unit to transfer the error information to the second computer, the second computer comprises a second error handler that, based on the error information that was sent via the first transfer unit and received via the second transfer unit, determines whether there is a failure in the first computer, and when it is determined that there is a failure, sends a computer switch notification to the second snapshot manager, and the second timing comprises a time when the second snapshot manager receives the computer switch notification, and wherein the error information includes information that indicates there is a possibility that the first computer will stop.

14. A non-transitory recording medium that stores a control program for a fault-tolerant computer system that includes a first computer that comprises a first memory and a first transfer unit, and operates a virtual machine comprising a guest Operating System (OS), and a second computer, the control program causing the first computer to:

acquire a snapshot of the virtual machine at each predetermined timing at the first computer;

save, in the first memory, difference information of a snapshot of the virtual machine at a timing from one previous timing; and transfer the difference information that is saved in the first memory to the second computer via the first transfer unit, wherein the first computer comprises a first error handler that acquires an error information of the first computer, and sends an instruction to the first transfer unit to transfer the error information to the second computer, the second computer comprises a second error handler that, based on the error information that was sent via the first transfer unit and received via a second transfer unit, determines whether there is a failure in the first computer, and when it is determined that there is a failure, sends a computer switch notification to the second snapshot manager, and the second timing comprises a time when the second snapshot manager receives the computer switch notification, and wherein the error information includes information that indicates there is a possibility that the first computer will stop.

15. A non-transitory recording medium that stores a control program for a fault-tolerant computer system that includes a first computer that operates a virtual machine comprising a guest Operating System (OS), and a second computer that comprises a first transfer unit that receives data that is transferred from the first computer and a first memory that saves the transferred data, wherein the transferred data comprises difference information of snapshots of the virtual computer, wherein the control program causes the second computer to:

generate a snapshot based on the difference information that was saved in the first memory;

save the snapshot generated based on the difference information in the first memory; and activate the guest OS at a predetermined timing at the second computer based on the snapshot that was saved in the first memory, wherein the first computer comprises a first error handler that acquires an error information of the first computer, and sends an instruction to the first transfer unit to transfer the error information to the second computer, the second computer comprises a second error handler that, based on the error information that was sent via the first transfer unit and received via a second transfer unit, determines whether there is a failure in the first computer, and when it is determined that there is a failure, sends a computer switch notification to the second snapshot manager, and the second timing comprises a time when the second snapshot manager receives the computer switch notification, and wherein the error information includes information that indicates there is a possibility that the first computer will stop.

16. A fault-tolerant computer system, including:

a first computer that comprises a first memory and first transfer means, and operates a virtual machine comprising a guest Operating System (OS); and a second computer that comprises a second memory and second transfer means that receives data that is transferred from the first transfer means, wherein the first computer comprises a first snapshot managing means that, together with acquiring a snapshot of the virtual machine at each predetermined timing at the first computer, saves, in the first memory, difference information of a snapshot of the virtual machine at a timing from one previous timing, and sends an instruction to the first transfer means to transfer the difference information that is saved in the first memory to the second memory via the first transfer means and second transfer means, wherein the second computer comprises a second snapshot managing means that, together with generating a snapshot based on the difference information that was transferred to the second memory via the first transfer means and the second transfer means and saving the snapshot generated based on the difference information in the second memory, activates the guest OS in the second computer at a predetermined timing at the second computer based on the snapshot that was saved in the second memory, wherein the first computer comprises a first error handler that acquires an error information of the first computer, and sends an instruction to the first transfer unit to transfer the error information to the second computer, the second computer comprises a second error handler that, based on the error information that was sent via the first transfer unit and received via the second transfer unit, determines whether there is a failure in the first computer, and when it is determined that there is failure, sends a computer switch notification to the second snapshot manager, and the second timing comprises a time when the second snapshot manager receives the computer switch notification, and wherein the error information includes information that indicates there is a possibility that the first computer will stop.

17. A fault-tolerant computer system including:

a first computer that comprises a first memory and a first transfer unit, and operates a virtual machine comprising a guest Operating System (OS); and a second computer that comprises a second memory and a second transfer unit that receives data that is transferred from the first transfer unit, wherein the first computer comprises a first snapshot manager that, together with acquiring a snapshot of the virtual machine at each predetermined timing at the first computer, saves, in the first memory, difference information of a snapshot of the virtual machine at a first timing from one previous timing, and sends an instruction to the first transfer unit to transfer the difference information that is saved in the first memory to the second memory via the first transfer unit and the second transfer unit, wherein the second computer comprises a second snapshot manager that, together with generating a snapshot based on the difference information that was transferred to the second memory via the first transfer unit and the second transfer unit and saving the snapshot generated based on the difference information in the second memory, activates the guest OS in the second computer at a predetermined timing at the second computer based on the snapshot that was saved in the second memory, wherein the first computer comprises a first error handler that acquires an error information of the first computer, and wherein the error information includes information that indicates there is a possibility that the first computer will stop.

* * * * *